(12) United States Patent
Di Domenico et al.

(10) Patent No.: US 8,589,733 B2
(45) Date of Patent: Nov. 19, 2013

(54) SAVING OPERATIONAL STATE OF OPEN APPLICATIONS WHEN UNEXPECTED SHUTDOWN EVENTS OCCUR

(75) Inventors: Daniela Di Domenico, Rome (IT); Viviana Tripodi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 12/856,326

(22) Filed: Aug. 13, 2010

(65) Prior Publication Data
US 2012/0042206 A1    Feb. 16, 2012

(51) Int. Cl.
G06F 11/00    (2006.01)

(52) U.S. Cl.
USPC .................... 714/24; 714/38.1; 714/38.11

(58) Field of Classification Search
USPC .................................. 714/24, 38.1, 38.11
See application file for complete search history.

(56) References Cited

U.S. PATENT DOCUMENTS

| | | | | |
|---|---|---|---|---|
| 5,317,752 A * | 5/1994 | Jewett et al. | ................ | 714/14 |
| 5,745,391 A * | 4/1998 | Topor | ................ | 713/321 |
| 6,108,792 A * | 8/2000 | Hanaoka | ................ | 713/323 |
| 6,195,754 B1 * | 2/2001 | Jardine et al. | ................ | 713/324 |
| 6,209,088 B1 * | 3/2001 | Reneris | ................ | 713/1 |
| 6,304,981 B1 * | 10/2001 | Spears et al. | ................ | 714/24 |
| 7,254,744 B2 * | 8/2007 | Dunstan et al. | ................ | 714/24 |
| 7,302,559 B2 * | 11/2007 | Oguma | ................ | 713/1 |
| 7,411,314 B2 * | 8/2008 | Dunstan | ................ | 307/64 |
| 7,426,661 B2 * | 9/2008 | Schaefer | ................ | 714/38.1 |
| 7,685,466 B2 * | 3/2010 | Dunstan et al. | ................ | 714/24 |
| 7,757,124 B1 * | 7/2010 | Singh et al. | ................ | 714/32 |
| 7,873,957 B2 * | 1/2011 | Nallipogu et al. | ................ | 717/168 |
| 8,032,788 B2 * | 10/2011 | Piacibello | ................ | 714/23 |
| 8,046,635 B2 * | 10/2011 | Kimura | ................ | 714/24 |
| 2012/0042002 A1 * | 2/2012 | Smith et al. | ................ | 709/203 |

* cited by examiner

*Primary Examiner* — Joshua P Lottich
(74) *Attorney, Agent, or Firm* — DeLizio Gilliam, PLLC

(57) ABSTRACT

Saving the state of at least one open application on a data processing system when an event forces open applications to close includes monitoring data processing system activities to detect an event indicative of a forthcoming system shutdown action. The system shutdown action includes a command which forces closing of running applications. Responsive to detecting the event, execution of said shutdown action is suspended and the state of the at least one open application is recorded. An indication that a state of the at least one running application has been recorded for reuse is stored and, following the recording and storing steps, execution of said shutdown action is restored.

19 Claims, 4 Drawing Sheets

SAVING OPERATIONAL STATE OF OPEN APPLICATIONS WHEN UNEXPECTED SHUTDOWN EVENTS OCCUR

TECHNICAL FIELD

The present invention relates to the field of data processing systems and more particularly to a method and system for saving the operational state of running applications in order to avoid possible loss of data when an unexpected shutdown occurs.

BACKGROUND SUMMARY

An unexpected event such as an unanticipated reboot command may force a system shutdown that the user may be unaware of (e.g. reboot while user away from computer), resulting in a high probability that the work in progress will be lost. Currently available prior art tools do not solve the problem of saving the application state immediately before the reboot is invoked. Even if the user is enabled to continue to use the same application, the work might be lost if not manually saved before reboot.

Some Operating Systems (e.g. Windows of Microsoft) provide the hibernate function which takes a snapshot of the system. The hibernate function freezes the system until it is restarted and does not allow changing registry keys. If the invoked shutdown is unexpected, however, the hibernate function is of little help. Furthermore, the freezing of the system would be incompatible with the necessity of changing registry keys when, for example, a forced reboot is invoked by the installation of a patch.

Another solution is the Advanced App Saver 1.0 of Asynchrony Solutions (available for some Windows version e.g. Windows 95, 98, ME or 2000) that saves currently running applications when a shutdown occurs. If a user leaves a Windows Explorer window opened when a shut down occurs on a Windows computer, the next time the operating system is started, that window will reappear. Unfortunately, the same is not true for any other windows that were open at the time the computer was shut down. The main purpose of App Saver is to extend the same functionality to other applications. It does this by configuring Windows to run the applications which were open the last time Windows was shut down when it next starts up. When Windows is restarted, all applications, which were running before the last shutdown, are restarted. However, this application is only about restarting and does not save the application state before the shutdown is invoked. Consequently, the user can continue to use the same application but might lose work if not manually saved before reboot.

SUMMARY OF THE INVENTION

A method, system, and computer program product are disclosed herein for saving the state of at least one open application on a data processing system when an event forces open applications to close. The method preferably includes a step of monitoring data processing system activities to detect an event indicative of a forthcoming system shutdown action, the system shutdown action including a command which forces closing of running applications. Responsive to detecting the event, execution of said shutdown action is suspended and the state of the at least one open application is recorded. An indication that a state of the at least one running application has been recorded for reuse is stored and, following the recording and storing steps, execution of said shutdown action is restored.

BRIEF DESCRIPTION OF THE DRAWINGS

Embodiments of the invention are herein described, by way of example, with reference to the accompanying FIGS. in which.

DETAILED DESCRIPTION

Figure 1:
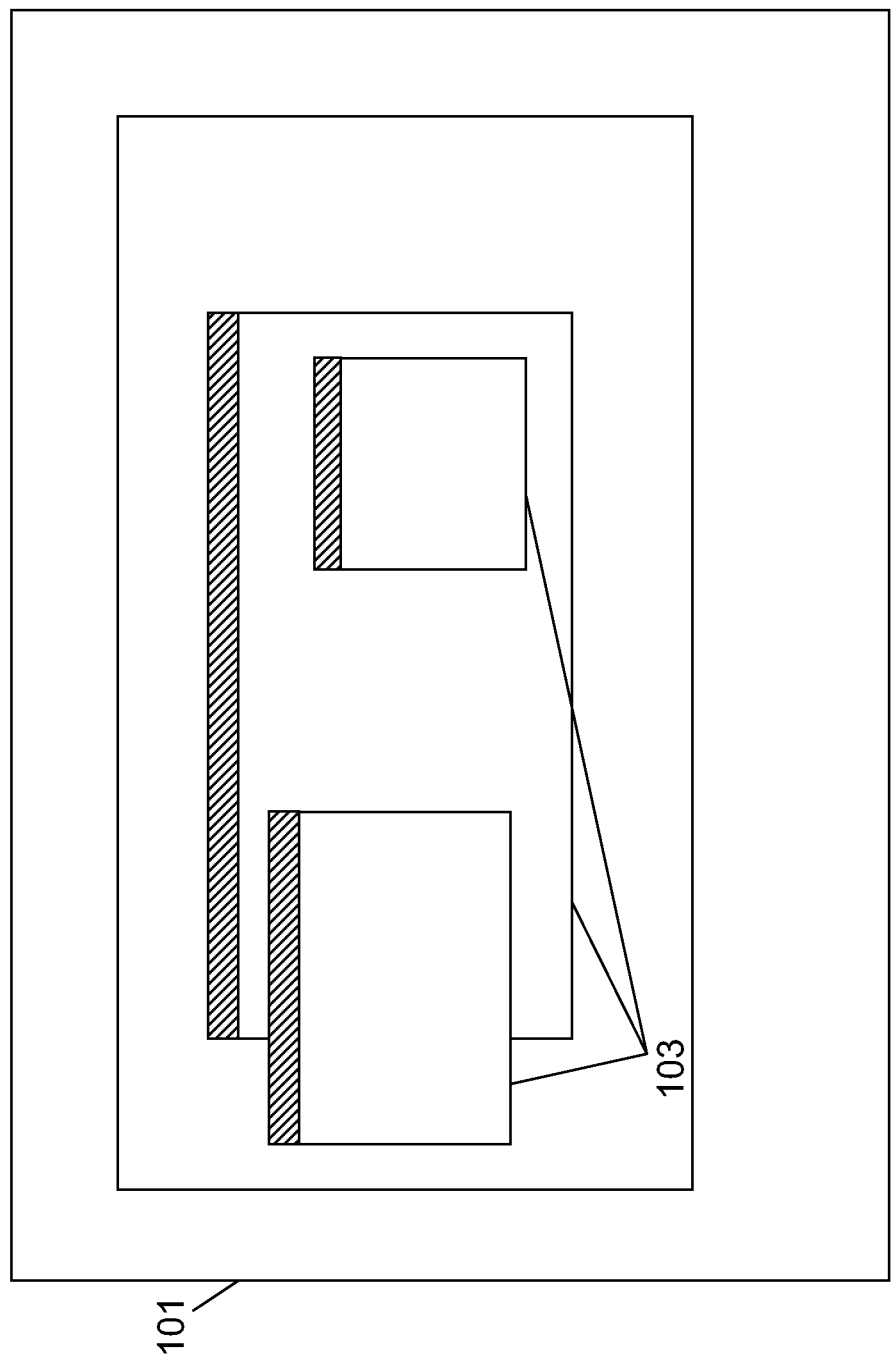
FIG. 1 is a schematic representation of a system implementing a preferred embodiment of the present invention.

Referring to FIG. 1, a system embodying the present invention is schematically represented. On a desktop 101 of a data processing system (e.g. a personal computer), multiple windows 103 are represented according to the well-known architecture of windows-based operating systems. Each window is related to at least one application and provides a user interface for such application. Those skilled in the art will appreciate that this is only an example of a suitable operating system with which the present invention can be implemented. It should be noted that while a windows-based operating system is depicted, other types of operating systems could be utilized.

When an unexpected event causing a system shutdown occurs, the method according to one embodiment saves the current state and all relevant data of the applications to avoid losing application state information and unsaved work/data during shutdown. To this end, a software tool, referred to herein as a Saving Tool, is the first application started at start up and is preferably continuously active as a daemon that continuously monitors the system to detect a shutdown request and/or events indicative of a forthcoming shutdown request. Responsive to detecting such an event or a shutdown request, the Saving Tool suspends the shutdown operations to allow the currently open applications (which were previously included in a list maintained by the Saving Tool) to save their current state and any unsaved data.

Figure 2:
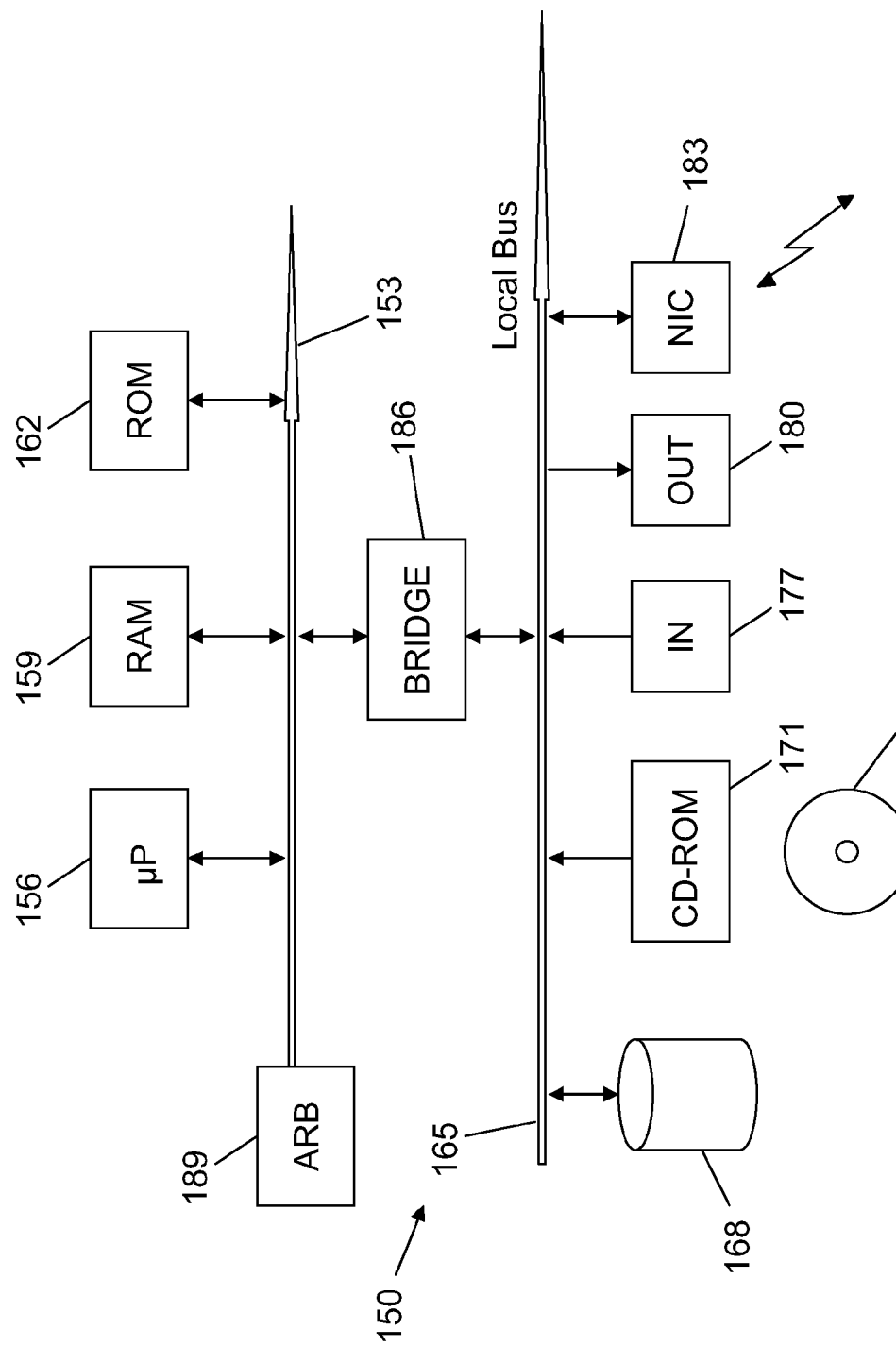
FIG. 2 is a block diagram of a computer system adapted to perform the method of a preferred embodiment of the present invention.

FIG. 2 illustrates a computer 150 which may be one of several alternative system types (e.g. personal computer, server, workstation). Computer 150 includes several units connected in parallel to a system bus 153. Specifically, one or more microprocessors 156 control operation of computer 150; a random access memory (RAM) 159 is directly utilized as a working memory by microprocessors 156, and a read-only memory (ROM) 162 stores basic code utilized for a starting up or "bootstrapping" computer 150. Peripheral units are clustered around a local bus 165 by means of respective interfaces. Particularly, a mass memory consists of a hard-disk 168 and a drive 171 for reading CD-ROMs 174. Moreover, computer 150 includes input devices 177 (e.g., a keyboard and a mouse), and output devices 180 (e.g., a monitor and a printer). A Network Interface Card 183 connects computer 150 to a network (not depicted). A bridge unit 186 interfaces system bus 153 with local bus 165. Each microprocessor 156 and bridge unit 186 can operate as master agents requesting access to system bus 153 for transmitting information. An arbiter 189 manages the granting of the access with mutual exclusion to system bus 153. Similar considerations apply if the system has a different topology, or it is based on other networks. Furthermore, a computer system that implements the present invention may have a different structure, may include equivalent units, or may consist of different data processing entities such as personal data assistants, mobile phones, and the like.

Figure 3:
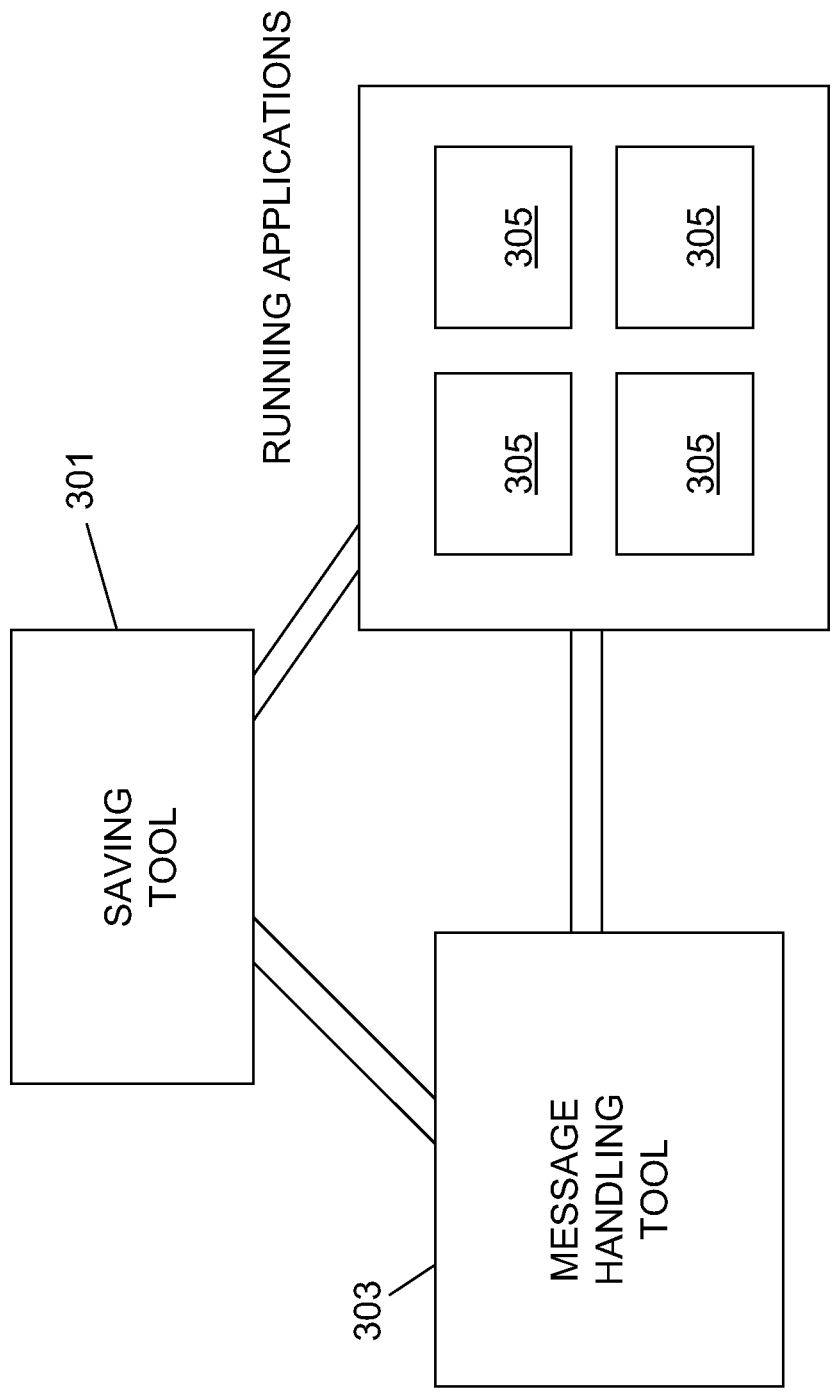
FIG. 3 is a schematic diagram of a preferred embodiment of the present invention.

As shown in FIG. 3, an embodiment of the present invention provides a mechanism that prevents losing state information or data of applications that are open at the time of an unexpected shutdown. A software Saving Tool 301 is launched at the start up of the operating system. The described implementation utilizes a Windows operating system (i.e., the APIs and commands compliant with Windows standards) as an exemplary but not an exclusive implementation.

Saving Tool 301 is responsible for: detecting when a shutdown has commenced or is forthcoming, such as when a reboot is invoked; saving the current system state; and enabling the system to return to its pre-shutdown state (e.g., state before a reboot). In order to perform the save and recovery actions, Saving Tool 301 identifies a set of one or more applications 305 for which the state and data will be saved. A list of applications 305 is maintained by Saving Tool 301 with detailed instructions for each application. The applications list, containing or used in conjunction with the detailed instructions, enables Saving Tool 301 to correlate each application with specific actions for saving the state of the listed applications.

Several steps are performed to integrate Saving Tool 301 into the system configuration including Saving Tool 301 being the first application launched at the start up of the operating system. Detectable system shutdown events are issued by the operating system and are a characteristic of the particular type of operating system. For example, Windows utilizes an embedded tool 303 named Message Handling in FIG. 3 to send a specific shutdown message to all currently running applications 305 when a system shutdown/restart sequence is invoked. When Saving Tool 301 starts, it calls the 'SetProcessShutdownParameters' application program interface (API) in order to designate itself as the first of all active application processes to receive the specific shutdown message when a shutdown/restart sequence is invoked. Designating Saving Tool 301 as the first application to receive the restart message ensures that all applications 305 remain open/running when the shutdown/restart message is received by Saving Tool 301. Preventing closure of the applications prior to interruption of the shutdown by Saving Tool 301 is also necessary to ensure that embedded tool 303 (Message Handling for Windows) finds the same applications open when the interrupted system shutdown is resumed. Otherwise, the embedded tool 303 cannot determine how many applications have been already closed and why.

The operating system sends the restart message first to Saving Tool 301 due, in one embodiment, to its designation as the highest priority process. Saving Tool 301 calls an application program interface (API) to retrieve the list of all active applications that it manages as well as retrieving sets of predetermined actions associated with each of the applications that are required to preserve and restore the respective applications' state and data. For example, a set of predetermined actions for saving a Lotus Notes application may be a command sequence such as: go to 'File', move cursor to 'Save Windows State,' and select. The predetermined action information can be provided by or otherwise obtained from the applications.

In an alternative embodiment, one or more of the applications can be instrumented to perform some or all of the above described own actions to preserve state information and data.

After saving the state information and data for the applications specified in the application list, Saving Tool 301 closes and system shutdown is resumed with the operating system sending the shutdown message to the remaining active applications. The reboot sequence commences operating system load and start up after all applications have been closed and the system shutdown.

In one embodiment, Saving Tool 301 is instrumented to save itself in the start-up section to ensure that when the user logs on after the reboot, Saving Tool 301 has been automatically restarted. Saving Tool 301 is the first application started by the operating system during restart (bootup). Once restarted, Saving Tool 301 automatically restarts the applications specified in the application list to their saved operational state by invoking the restore commands inserted in or otherwise associated with their respective entries on the applications list. In an alternate embodiment, the application restart step can be customisable so that a user is enabled to selective determine which applications to restart.

Figure 4:
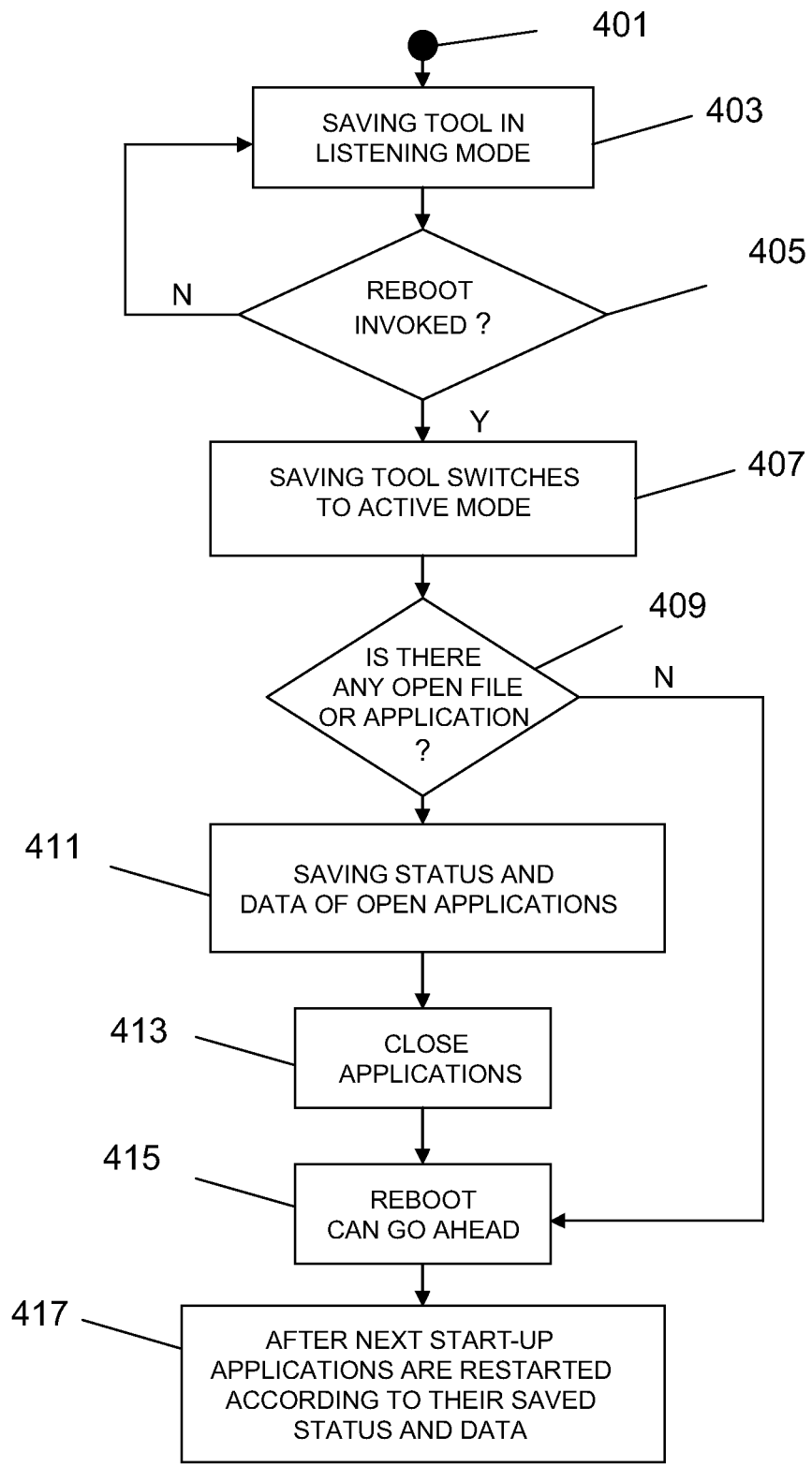
FIG. 4 is a flow chart of the method of the preferred embodiment.

Referring to FIG. 4, the steps of a method according to a preferred embodiment of the present invention are described. The process starts as depicted at steps 401 and 403 with the Saving Tool in Listening Mode in which it continuously monitors the system to detect a reboot invocation or other shutdown precursor event as shown in step 405. To enable reliable system monitoring, the Saving Tool is the first application loaded/started at startup. As explained above, to ensure reliable application state and data preservation, the Save Tool is optimally the first of all currently open application processes to detect a shutdown event. As previously explained, this optimal condition is achieved by using the 'SetProcessShutdownParameters' API or otherwise to designate the Save Tool as the first of all active application processes to receive the shutdown message when a shutdown/restart sequence is invoked. In one embodiment, the Saving Tool detects a shutdown event by receiving a command from the operating system, such as from Message Handling Tool 303 depicted in FIG. 3 that a system shutdown is underway or is forthcoming. In response to detecting a shutdown event, the Saving Tool switches to Active Mode (step 407) and verifies whether there are any active applications and/or open files (step 409). If no active/open applications are found, the reboot shutdown resumes as illustrated at step 415. Otherwise, as depicted at steps 411 and 413, the reboot shutdown is suspended and the Saving Tool performs those operations required to save state and current data of the open applications specified in the application list prior to shutdown (step 411).

After the applications' state and data have been saved, the applications are closed (step 413) and the shutdown phase of reboot is resumed (step 415). After the next start up, the Saving Tool according to one embodiment restarts all applications that were closed at step 413 to the state and with the data they had at the time the reboot was invoked. To ensure that the Saving Tool is the first application to be started as the first process at the next startup, the Saving Tool is inserted in a list of software programs started at boot. For instance in Windows, through the following registry keys it is possible to manage programs to be started at system start-up:

HKEY_LOCAL_MACHINES\Software\Microsoft\Windows\CurrentVersion\RunServicesOnce
HKEY_CURRENT_USER\Software\Microsoft\Windows\CurrentVersion\RunServicesOnce
HKEY_LOCAL_MACHINES\Software\Microsoft\Windows\CurrentVersion\RunServices
HKEY_CURRENT_USER\Software\Microsoft\Windows\CurrentVersion\RunServices
HKEY_LOCAL_MACHINES\Software\Microsoft\Windows\CurrentVersion\RunOnce -continued

```
HKEY_LOCAL_MACHINES\Software\Microsoft\Windows\
CurrentVersion\RunOnceEx
HKEY_LOCAL_MACHINES\Software\Microsoft\Windows\
CurrentVersion\Run registry key
HKEY_CURRENT_USER\Software\Microsoft\Windows\
CurrentVersion\Runregistry key
```

Inserting proper values in these registry keys it is possible to start the Saving Tool as the first process.

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has a different structure or includes equivalent units; in any case, it is possible to replace the computer with any code execution entity (such as a PDA, a mobile phone, and the like).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

The invention claimed is:

1. A method in a data processing system for saving state of at least one application that is open on said data processing system when an event forces open applications to close, the method comprising:
   executing a software tool at start up of the data processing system, wherein the software tool is distinct from an operating system of the data processing system;
   maintaining, by the software tool, a list of a plurality of applications and for each respective application included in the list, recording, by the software tool, a set of predetermined actions to be performed for saving current state of the application;
   monitoring, by the software tool, data processing system activities to detect the event indicative of a forthcoming system shutdown action, the system shutdown action including a command which forces closing of open applications; and
   responsive to detecting said event, the software tool:
      suspending execution of said shutdown action prior to the at least one open application detecting the event;
      recording a current state of the at least one open application, wherein said recording the current state of the at least one open application includes, for each open application of the plurality of applications, performing the corresponding set of predetermined actions; and
      storing an indication that the current state of the at least one open application has been recorded for reuse; and
      following said recording and storing steps, restoring execution of said shutdown action.

2. The method of claim 1, wherein the current state of the at least one open application includes an application operational state.

3. The method of claim 1, wherein the current state of the at least one application includes any unsaved data generated by use of the at least one application.

4. The method of claim 1, wherein the event indicative of a forthcoming system shutdown action includes a reboot request issued by an operating system.

5. The method of claim 1, wherein the list of the plurality of applications and the corresponding set of predetermined actions is maintained by the software tool.

6. The method of claim 1, further comprising:
   at start up of the data processing system, executing the software tool and determining, by the software tool, whether an indication that state of one or more applications has been recorded before a previous shutdown event has been stored in the data processing system; and
   responsive to determining that the indication has been recorded, the software tool restarting those of the one or more applications according to the recorded state.

7. A non-transitory computer-readable storage medium having encoded thereon computer-readable instructions for saving state of at least one application that is open on a data processing system when an event forces open applications to close, said computer-readable instructions being executable by a machine to perform operations comprising:
   maintaining a list of a plurality of applications and for each respective application included in the list, recording a set of predetermined actions to be performed for saving current state of the application;
   monitoring data processing system activities to detect the event indicative of a forthcoming system shutdown action, the system shutdown action including a command which forces closing of open applications; and
   responsive to detecting said event:
      suspending execution of said shutdown action prior to the at least one open application detecting the event;
      recording a current state of the at least one open application, wherein said recording the current state of the at least one open application includes, for each open application of the plurality of applications, performing the corresponding set of predetermined actions; and
      storing an indication that the current state of the at least one open application has been recorded for reuse; and
      following said recording and storing steps, restoring execution of said shutdown action.

8. The computer-readable storage medium of claim 7, wherein the current state of the at least one open application includes an application operational state.

9. The computer-readable storage medium of claim 7, wherein the current state of the at least one application includes any unsaved data generated by use of the at least one application.

10. The computer-readable storage medium of claim 7, wherein the event indicative of a forthcoming system shutdown action includes a reboot request issued by an operating system.

11. The computer-readable storage medium of claim 7, wherein at start up of the data processing system, a software tool that implements said monitoring step is executed.

12. The computer-readable storage medium of claim 11, wherein the list of the plurality of applications and the corresponding set of predetermined actions is maintained by the software tool.

13. The computer-readable storage medium of claim 7 further having computer-readable program instruction executable by a machine to perform operations further comprising:

at start up of the data processing system, determining whether an indication that state of one or more applications has been recorded before a previous shutdown event has been stored in the data processing system; and
   responsive to determining that the indication has been recorded, restarting those of the one or more applications according to the recorded state.

14. A data processing system programmed to save state of at least one application that is open on said data processing system when an event forces open applications to close, wherein the data processing system comprises:

a processor;
   a computer-readable storage medium having program instructions stored therein, the program instructions executable to cause the data processing system to perform operations comprising,
   maintaining a list of a plurality of applications and for each respective application included in the list, recording a set of predetermined actions to be performed for saving current state of the application;
   monitoring data processing system activities to detect the event indicative of a forthcoming system shutdown action, the system shutdown action including a command which forces closing of open applications; and
   responsive to detecting said event:
      suspending execution of said shutdown action prior to the at least one open application detecting the event;
      recording a current state of the at least one open application, wherein said recording the current state of the at least one open application includes, for each open application of the plurality of applications, performing the corresponding set of predetermined actions; and
      storing an indication that the current state of the at least one open application has been recorded for reuse; and
      following said recording and storing steps, restoring execution of said shutdown action.

15. The data processing system of claim 14, wherein the current state of the at least one open application includes an application operational state.

16. The data processing system of claim 14, wherein the current state of the at least one application includes any unsaved data generated by use of the at least one application.

17. The data processing system of claim 14, wherein the event indicative of a forthcoming system shutdown action includes a reboot request issued by an operating system.

18. The data processing system of claim 14, wherein at start up of the data processing system, a software tool that implements said monitoring step is executed.

19. The data processing system of claim 18, wherein the list of the plurality of applications and the corresponding set of predetermined actions is maintained by the software tool.

* * * * *